(12) United States Patent
Bhat et al.

(10) Patent No.: US 11,574,282 B2
(45) Date of Patent: Feb. 7, 2023

(54) OPTIMAL CARGO SPACE UTILIZATION BASED ON DETECTION OF ITEMS

(71) Applicant: International Business Machines Corporation, Armonk, NY (US)

(72) Inventors: Ramprasad Bhat, Bangalore (IN); Santanu Chakrabarty, Bangalore (IN); Vijay Nagraj, Bangalore (IN); Sourav Bhattacharjee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 16/722,764

(22) Filed: Dec. 20, 2019

(65) Prior Publication Data

US 2021/0192429 A1 Jun. 24, 2021

(51) Int. Cl.
*G06Q 10/08* (2012.01)
*G06N 20/20* (2019.01)

(52) U.S. Cl.
CPC ........... *G06Q 10/087* (2013.01); *G06N 20/20* (2019.01)

(58) Field of Classification Search
CPC .............................. G06Q 10/087; G06Q 50/28
See application file for complete search history.

(56) References Cited

U.S. PATENT DOCUMENTS

| 4,832,242 | A | 5/1989 | Leek |
| 5,076,698 | A | 12/1991 | Smith et al. |
| 6,674,904 | B1 | 1/2004 | McQueen |
| 6,874,667 | B2 | 4/2005 | Dykstra et al. |

(Continued)

FOREIGN PATENT DOCUMENTS

| CA | 2405785 A1 | 11/2001 |
| CN | 202225891 U | 5/2012 |

(Continued)

OTHER PUBLICATIONS

M. Thiyagarajan, et al., "RFID based Advanced Shopping Trolley for Super Market", ResearchGate, Jun. 2017, https://www.researchgate.net/publication/318946385_RFID_based_Advanced_Shopping_Trolley_for_Super_Market, 7 pages.

*Primary Examiner* — Florian M Zeender
*Assistant Examiner* — Vanessa Deligi
(74) *Attorney, Agent, or Firm* — Edell, Shapiro & Finnan, LLC

(57) ABSTRACT

A method, computing system, and computer program product are provided. Items at a source location are detected and classified, with respect to fragility and perishability, based on characteristics of the each respective item and is performed by trained machine learning models. Item boundaries are predicted based on applying respective data regarding points on a surface of the each respective item to a trained second machine learning model to predict the item boundaries. The each respective item is classified into a respective group with respect to an available volume of the cargo space based on sensor data of the cargo space, the classified fragility and perishability, the predicted item boundaries, and a third machine learning model. An arrangement of the items in the cargo space is determined based on the group classifications and a corresponding destination location associated with the each respective item and is visualized relative to the cargo space.

18 Claims, 15 Drawing Sheets

(56) References Cited

U.S. PATENT DOCUMENTS

| | | | |
|---|---|---|---|
| 7,628,440 B2 | 12/2009 | Bernhardsson et al. | |
| 7,648,066 B2 | 1/2010 | Kangas et al. | |
| 8,408,581 B1 | 4/2013 | Hunter | |
| 8,540,273 B2 | 9/2013 | Dobrachinski | |
| 8,979,115 B1 | 3/2015 | Baron | |
| 10,248,927 B2 | 4/2019 | Tammattabattula | |
| 11,204,678 B1* | 12/2021 | Baker | G06F 3/04842 |
| 2009/0265179 A1* | 10/2009 | Cunniff | G06Q 20/40 |
| | | | 705/1.1 |
| 2012/0317059 A1 | 12/2012 | Joshi et al. | |
| 2014/0372351 A1* | 12/2014 | Sun | G06Q 10/087 |
| | | | 706/12 |
| 2016/0086255 A1* | 3/2016 | Sainfort | G06Q 30/0613 |
| | | | 705/26.82 |
| 2018/0174262 A1 | 6/2018 | Wilkinson et al. | |
| 2018/0181126 A1* | 6/2018 | Seaman | B60R 25/01 |
| 2018/0200761 A1* | 7/2018 | Putcha | G06Q 50/28 |
| 2019/0122275 A1 | 4/2019 | Goffin et al. | |
| 2019/0213529 A1* | 7/2019 | Donnelly | G06F 16/532 |
| 2019/0236528 A1* | 8/2019 | Brooks | G06Q 10/06315 |
| 2020/0038917 A1* | 2/2020 | McBride | B41J 11/70 |

FOREIGN PATENT DOCUMENTS

| | | |
|---|---|---|
| CN | 108422938 A | 8/2018 |
| DE | 102014008482 A1 | 5/2019 |
| JP | 2004021836 A | 1/2004 |

\* cited by examiner

OPTIMAL CARGO SPACE UTILIZATION BASED ON DETECTION OF ITEMS

BACKGROUND

1. Technical Field

Present invention embodiments relate to methods, systems and computer program products for detecting attributes of items to be loaded into a vehicle or other cargo space and presenting optimal arrangements of items in the cargo space based upon the attributes and drop off location of each of the items.

2. Discussion of the Related Art

Vehicles, which may include, but not be limited to, commercial vehicles for picking up and dropping off various items at different locations have a finite amount of cargo space. The vehicles may carry items of various shapes and sizes, some of which may be fragile, perishable and/or may be oddly shaped. As a result, when loading of the items into the cargo space, one must take into consideration various attributes of each of the items such that none of the items carried in the cargo space become damaged during transport. For example, when arranging items in a cargo space of a vehicle, one must consider fragility and weights of the various items in order to avoid damaging fragile items by placing heavy items on top of the fragile items.

In commercial vehicles, for example, if one does not consider pickup and drop-off locations of the items when arranging the items in the cargo space, items to be unloaded at a drop-off location may be inconveniently positioned within the cargo space such that numerous items must be moved in order to gain access to those items to be unloaded.

Further, inefficient use of the cargo space in such vehicles may not enable additional items to fit into the cargo space without rearranging the items already in the cargo space.

SUMMARY

According to one embodiment of the present invention, a method is provided for detecting and arranging items in a cargo space. At least one processor detects and classifies, with respect to fragility and perishability, multiple items at a source location. The classifying is based on obtained characteristics of the each respective item and is performed by multiple machine learning models trained with a training set of items. The at least one processor predicts item boundaries based on applying respective data regarding points on a surface of the each respective item to a second machine learning model trained to predict the item boundaries based on the points. The each respective item is classified, by the at least one processor, into a respective group with respect to an available volume of the cargo space based on sensor data of the cargo space, the classified fragility and perishability, the predicted item boundaries, and a third machine learning model. The at least one processor determines an arrangement of the items in the cargo space based on the group classifications and a corresponding destination location associated with the each respective item. The arrangement of the items is visualized, by the at least one processor, relative to the cargo space.

According to a second embodiment of the present invention, a computing system is provided for determining and arranging items in a cargo space. The computing system includes at least one processor, at least one memory connected with the at least one processor, and a network interface for the computing system to communicate with one or more other devices via a network. The at least one processor detects and classifies, with respect to fragility and perishability, multiple items at a source location. The classifying is based on obtained characteristics of the each respective item and is performed by multiple machine learning models trained with a training set of items. Item boundaries are predicted based on applying respective data regarding points on a surface of the each respective item to a second machine learning model trained to predict the item boundaries based on the points. The each respective item is classified into a respective group with respect to an available volume of the cargo space based on sensor data of the cargo space, the classified fragility and perishability, the predicted item boundaries, and a third machine learning model. An arrangement of the items in the cargo space is determined based on the group classifications and a corresponding destination location associated with the each respective item. The at least one processor visualizes the arrangement of the items relative to the cargo space.

According to a third embodiment of the present invention, a computer program product is provided for determining and arranging items in a cargo space. The computer program product includes at least one computer readable storage medium having computer readable program code embodied therewith for execution on one or more processors to perform a number of steps. The steps include detecting and classifying, with respect to fragility and perishability, multiple items at a source location. The classifying is based on obtained characteristics of the each respective item and is performed by multiple machine learning models trained with a training set of items. Item boundaries are predicted based on applying respective data regarding points on a surface of the each respective item to a second machine learning model trained to predict the item boundaries based on the points. The each respective item is classified into a respective group with respect to an available volume of the cargo space based on sensor data of the cargo space, the classified fragility and perishability, the predicted item boundaries, and a third machine learning model. An arrangement of the items in the cargo space is determined based on the group classifications and a corresponding destination location associated with the each respective item. The arrangement of items is visualized relative to the cargo space.

BRIEF DESCRIPTION OF THE DRAWINGS

Generally, like reference numerals in the various figures are utilized to designate like components.

DETAILED DESCRIPTION

In various embodiments, vehicles, which include, but are not limited to, commercial vehicles may pick up various items from a source location and may drop-off the various items at different destination locations. Some of the items may be extremely fragile, other items may be less fragile, and yet other items may be unbreakable. Further, some of the items may have irregular shapes, some items may be perishable, different items may have different weights, etc.

Each vehicle may have a respective cargo space of a known size and may have a unique identifier for identifying the respective vehicle. The vehicles may include sensors within their respective cargo spaces. The sensors may detect various points on surfaces of items included in cargo space and may transmit data regarding the detected points to a processing engine, which may be located in a cloud environment in some embodiments. The processing engine may be provided with the unique identifier of the vehicle and may obtain a cargo space capacity of the vehicle based on the unique identifier. The processing engine may determine shapes of items in the cargo space of the vehicle based on the data received from the sensors and may further determine an amount of available cargo space remaining.

A source location from which items may be loaded into the cargo space of the vehicle may include sensors and at least one bar code scanner. In some embodiments, the sensors may include infrared sensors for determining points on surfaces of items. Data regarding the determined points may be provided to the processing engine, which may determine a surface contour of the items based on the determined points. The one or more barcode scanners may scan one or more barcodes associated with each item, which may be mapped to a set of attributes that are provided to the processing engine. Alternatively, the one or more barcode scanners may provide raw data from reading the one or more barcodes of an item to the processing engine, which may map the raw data to the set of attributes. The set of attributes then may undergo a set of classification cycles, which will be explained in more detail below. Based on the resulting classifications, the processing engine may determine an optimal arrangement of the items in the cargo space of the vehicle such that the cargo space is used efficiently, the arrangement is optimized for loading and offloading, and damage to the items is prevented during transport. The optimal arrangement may be presented on a display of a computing device. The cargo space may be any cargo space of a mobile or stationary structure.

Figure 1:
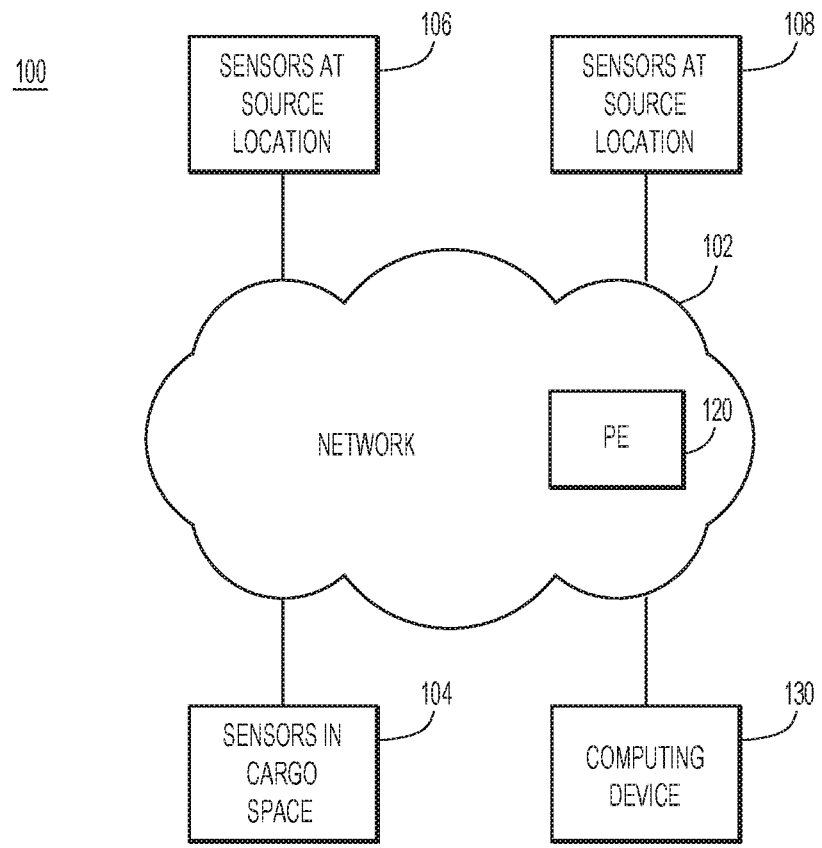
FIG. 1 is a diagrammatic illustration of an example operating environment according to an embodiment of the present invention.

FIG. 1 illustrates an example environment 100 in which embodiments may be implemented. A processing engine 120 may be implemented in a cloud environment of a network 102. Sensors 104 may be included in cargo spaces of a number of vehicles for transporting items. In some embodiments, the sensors may include infrared sensors. Sensors 106, which may include infrared sensors, may be arranged at a source location for items such that sensors 106 may obtain data points on a surface of each item to be picked up at the source location and may provide the obtained data points to processing engine 120. One or more barcode scanners 108 located at the source location may scan one or more barcodes associated with each of the items and barcode data may be provided to processing engine 120. The barcode data associated with an item may include information regarding a number of attributes of the item such as, for example, weight, item type, manufactured date, expiration date, etc.

Computing device 130 may provide a unique identifier of a specific vehicle to processing engine 140 via network 102. Processing engine 120 may obtain a cargo space capacity of the vehicle corresponding to the provided unique identifier. Based on the provided bar code data and the sensed data points, processing engine 120 may determine an optimal arrangement of the items in the cargo space and may present the optimal arrangement via a display of computing device 130. Computing device 130 may include, but not be limited to, a personal computer, a laptop computer, a notebook computer, a handheld computer, or a host computer.

Network 102 may be implemented by any number of any suitable communications media (e.g., wide area network (WAN), local area network (LAN), Internet, Intranet, etc.).

Figure 2:
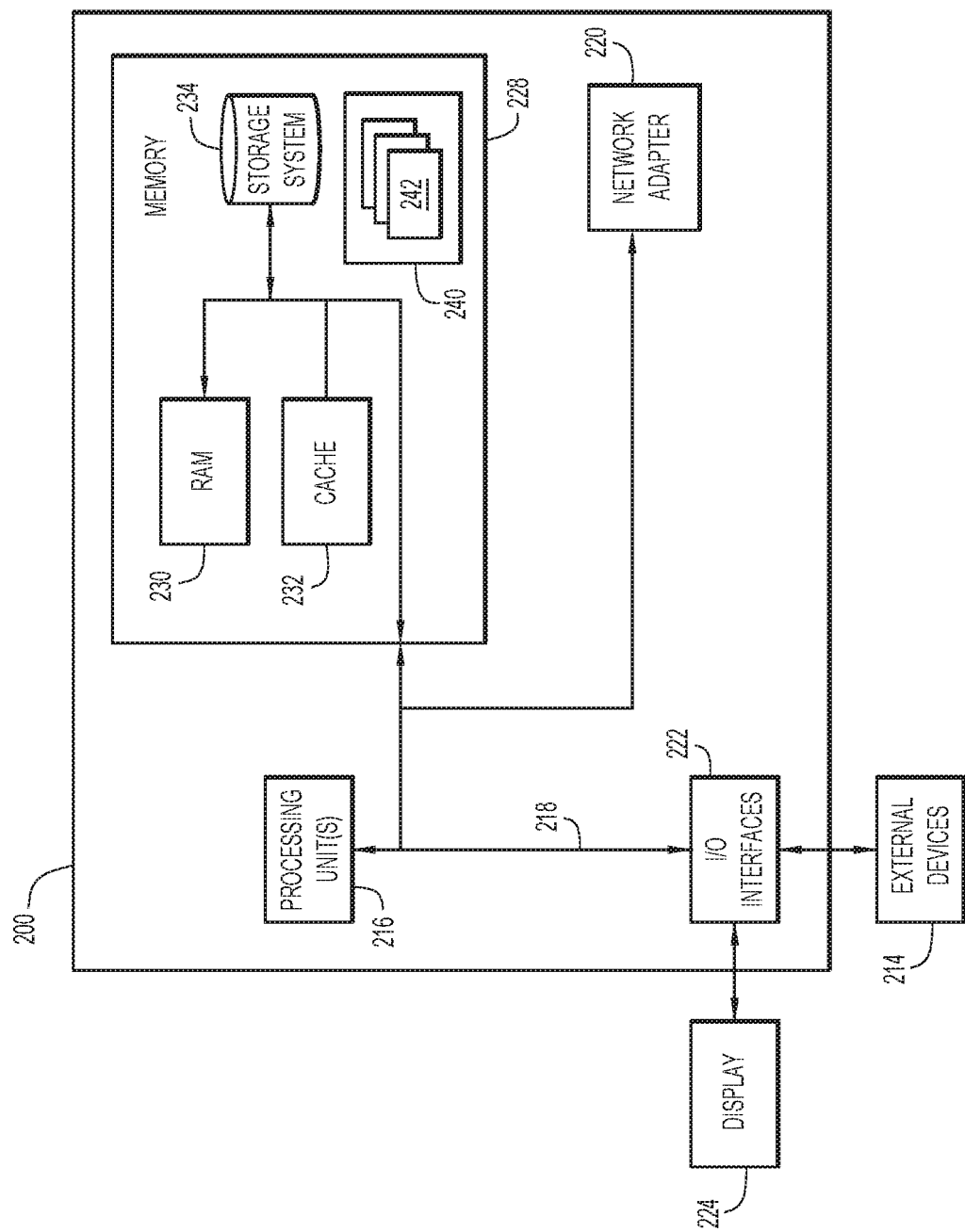
FIG. 2 is a block diagram of an example computing device according to an embodiment of the present invention.

Referring now to FIG. 2, a schematic of an example of a computing device 200 of environment 100 (e.g., implementing processing engine 140, computing device 130, and/or sensors 104, 106 and bar code scanners 108) is shown. Computing device 200 is only one example of a suitable computing device for environment 100 and is not intended to suggest any limitation as to the scope of use or functionality of embodiments of the invention described herein. Regardless, computing device 200 is capable of being implemented and/or performing any of the functionality set forth herein.

In computing device 200, there is a computer system which is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing device 200 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computing device 200 is shown in the form of a general-purpose computing device. The components of computing device 200 may include, but are not limited to, one or more processors or processing units 216, a system memory 228, and a bus 218 that couples various system components including system memory 228 to processor 216. When computing device 200 implements a bar code scanner, a bar code scanning unit (not shown) may be coupled to various system components via bus 218. When computing device 200 implements a sensor device, a sensor unit (not shown) may be coupled to various system components via bus 218.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing device 200 typically includes a variety of computer system readable media. Such media may be any available media that is accessible by computing device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242 may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computing device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with computing device 200. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
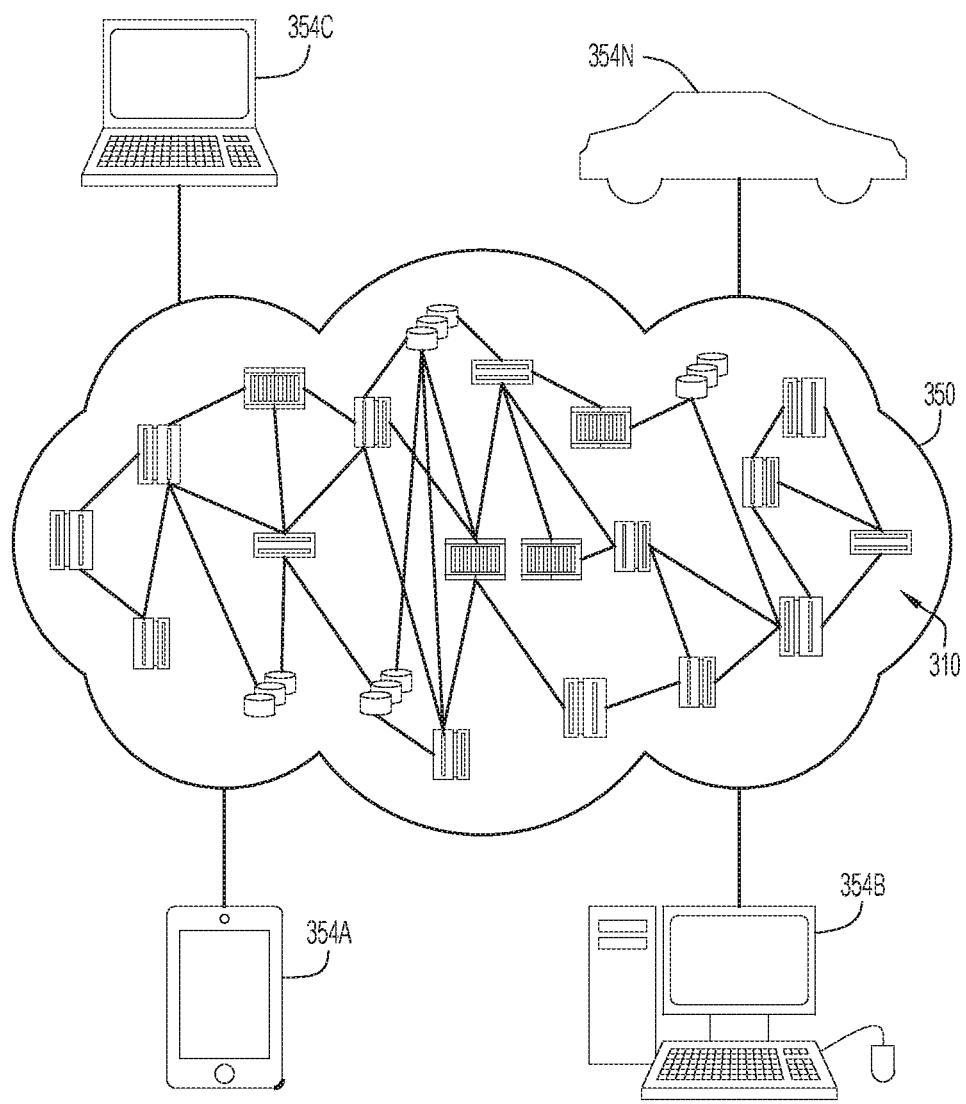
FIG. 3 illustrates an example cloud computing environment in which various embodiments may be implemented.

Referring now to FIG. 3, illustrative cloud computing environment 350 is depicted. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Figure 4:
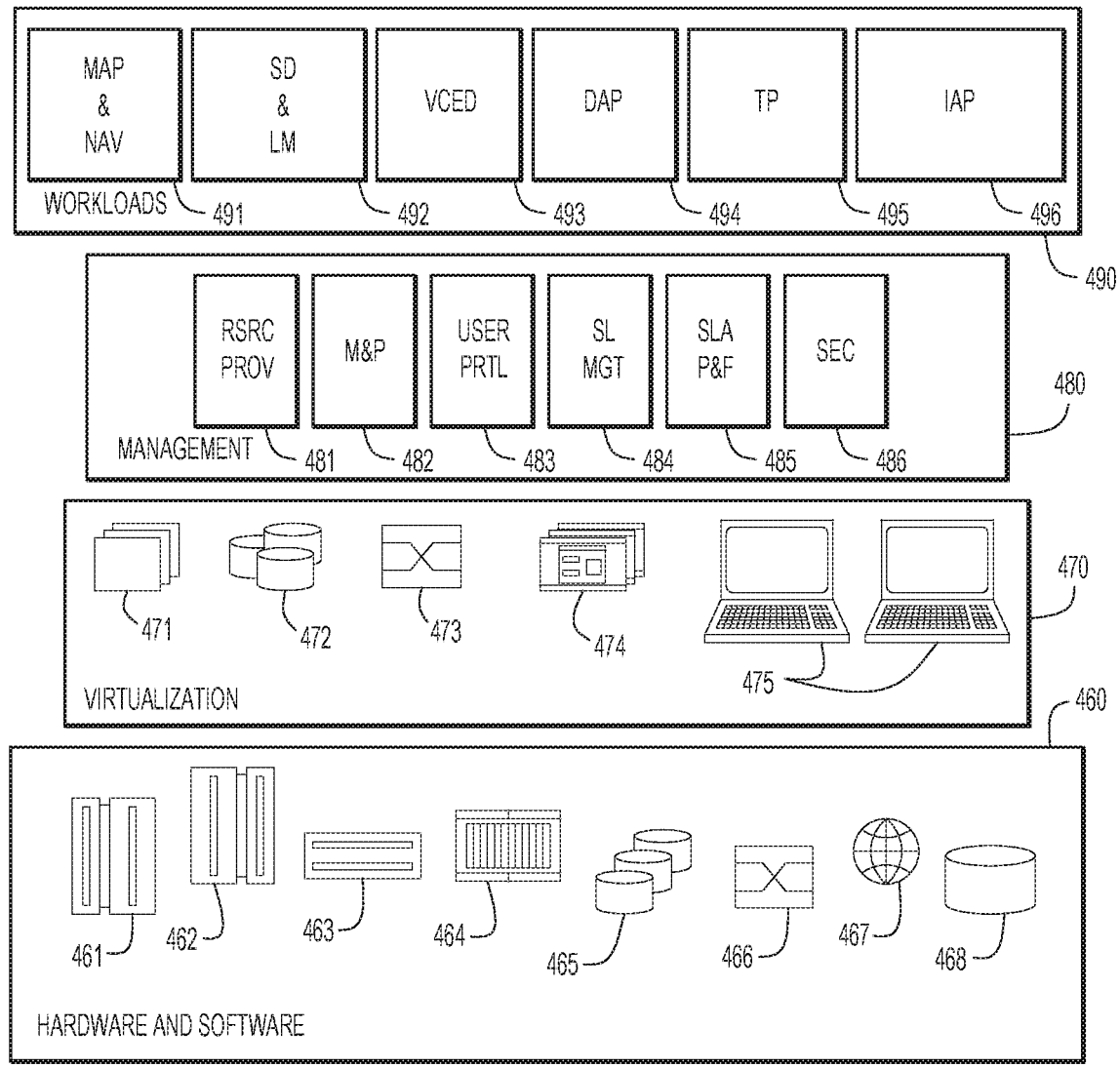
FIG. 4 illustrates a set of functional abstraction layers that may be provided by a cloud computing environment according to various embodiments.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security (SEC) 486 provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation (MAP&NAV) 491; software development and lifecycle management (SD&LM) 492; virtual classroom education delivery (VCED) 493; data analytics processing (DAP) 494; transaction processing (TP) 495; and item arrangement processing (IAP) 496.

In various embodiments, one or more barcode scanners at a source location for one or more items may scan a barcode associated with each respective item to be picked up. The scanned barcode may be mapped to values of multiple attributes associated with the respective item. Relative fragility and perishability among a given number, N, of items may be derived from factors relevant for the N items based on the one or more scanned barcodes associated with each of the items. Machine learning may be used to classify the items according to fragility and perishability.

Figure 5:
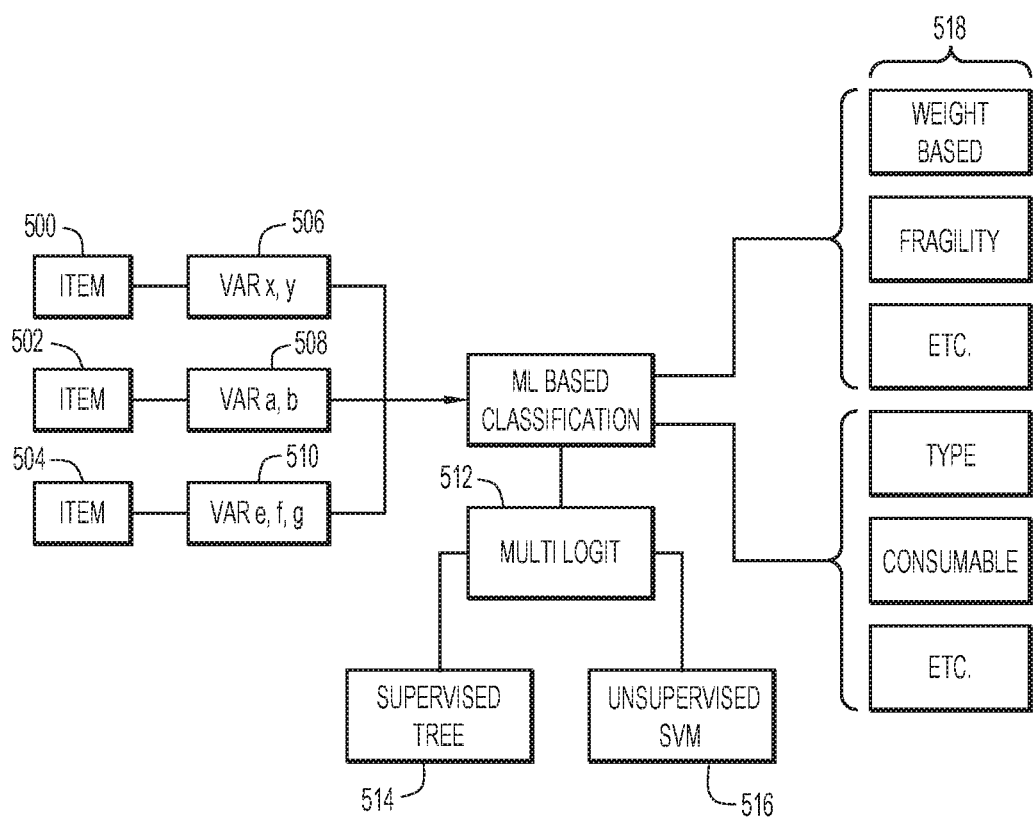
FIG. 5 shows a flow of an example machine learning process for classifying items to be loaded into a cargo space of a vehicle according to an embodiment of the present invention.

FIG. 5 illustrates an example machine learning process for classifying items based on attribute values obtained by scanning associated barcodes. FIG. 5 shows items 500, 502, 504, which have been scanned by a barcode scanner in order to obtain attribute values. The attribute values may be considered respective independent variables 506, 508, 510, for each of items 500, 502, 504. The attribute values then may undergo a set of classification cycles.

Multi logit 512, also known as multinomial logistic regression, is logistic regression used to classify an item based on attributes such as, for example, weight, type, etc., to predict a probability value of the item being classified in a particular group.

A supervised decision tree 514 may be provided with output from multi logit 512 in order to drill down the attributes and identify more detailed subclasses. For example, supervised decision tree 514 may analyze attribute values such as, for example, weight, type, expiration date, content volume, consumable, etc. to establish how fragile and perishable each of the items is.

An unsupervised support vector machine (SVM) 516 is an unsupervised decision boundary mechanism that analyzes each group and determines a decision boundary based on information from previous machine learning steps. Unsupervised SVM 516 identifies overlapping groups and, depending upon a proximity from a decision boundary, creates a final set of classification groups.

Figure 6:
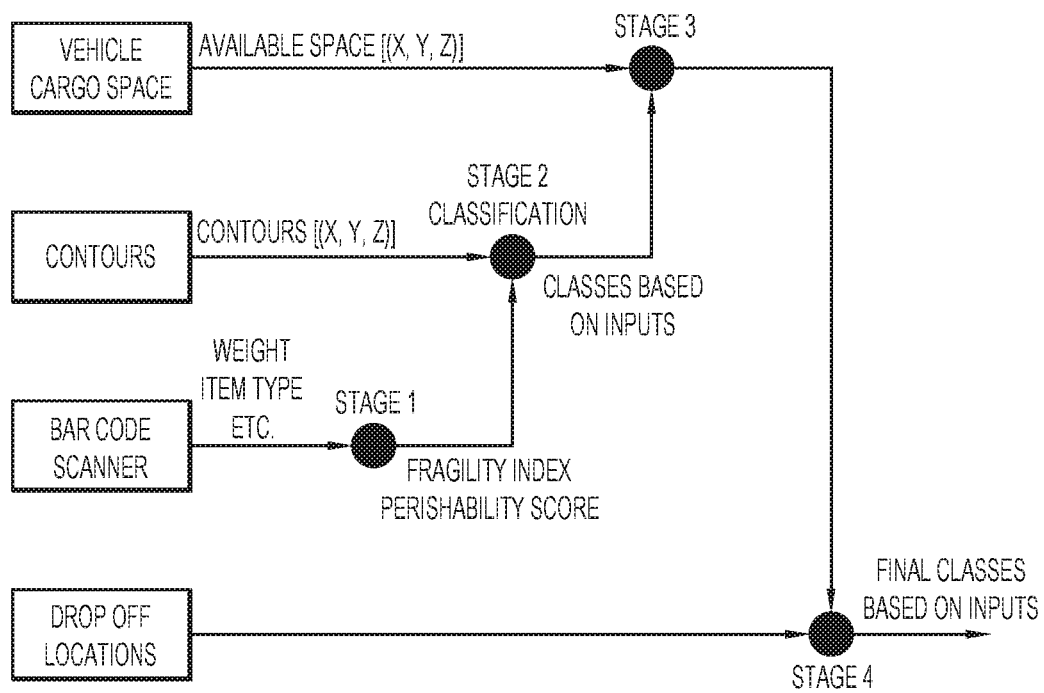
FIG. 6 illustrates an example process flow, which includes multiple classifying stages, for classifying items to determine an optimal arrangement of the items in a cargo space of a vehicle according to an embodiment of the present invention.

FIG. 6 illustrates an example process flow that may be used in various embodiments. A classification approach used in embodiments is an iterative approach that includes analyzing the items multiple times to identify how a set of N items can be grouped and how each group can be arranged within available cargo space of a vehicle. The approach may include using different classification methods, beginning at stage 1 with determining a relative fragility index and a relative perishability score of the N items based on barcode details of each item. The details of each item may be unique and respective barcode details are considered as a set of variables such as, for example, weight, item type, is edible, content (e.g., multipacks, etc.), state (e.g., liquid, solid, or gas), etc., derived from scanned barcodes associated with each item. Once stage 1 is completed, stage 2 may begin.

Sensors, which may include infrared sensors, may determine coordinates of items with respect to a fixed spatial position, thereby providing spatial details of each of the items in a form of sensor point data. The sensor point data then may be provided to a contour tracing method of item arrangement processing 496. The contour tracing method may include an artificial intelligence (AI) powered method that uses the sensor point data and knowledge derived from training with earlier sensor data to predict lines/contours connecting sensor points for predicting an item boundary or outline.

At stage 2, each of the items may be classified, or grouped, based on respective predicted item boundary or outline of each of the items, relative fragility index and perishability score.

At stage 3, stage 2 output may be classified further into groups with respect to an available amount of cargo space in a vehicle.

At stage 4, output from stage 3 is used to create a final grouping of items considering drop off locations for each of the items.

Figure 7:
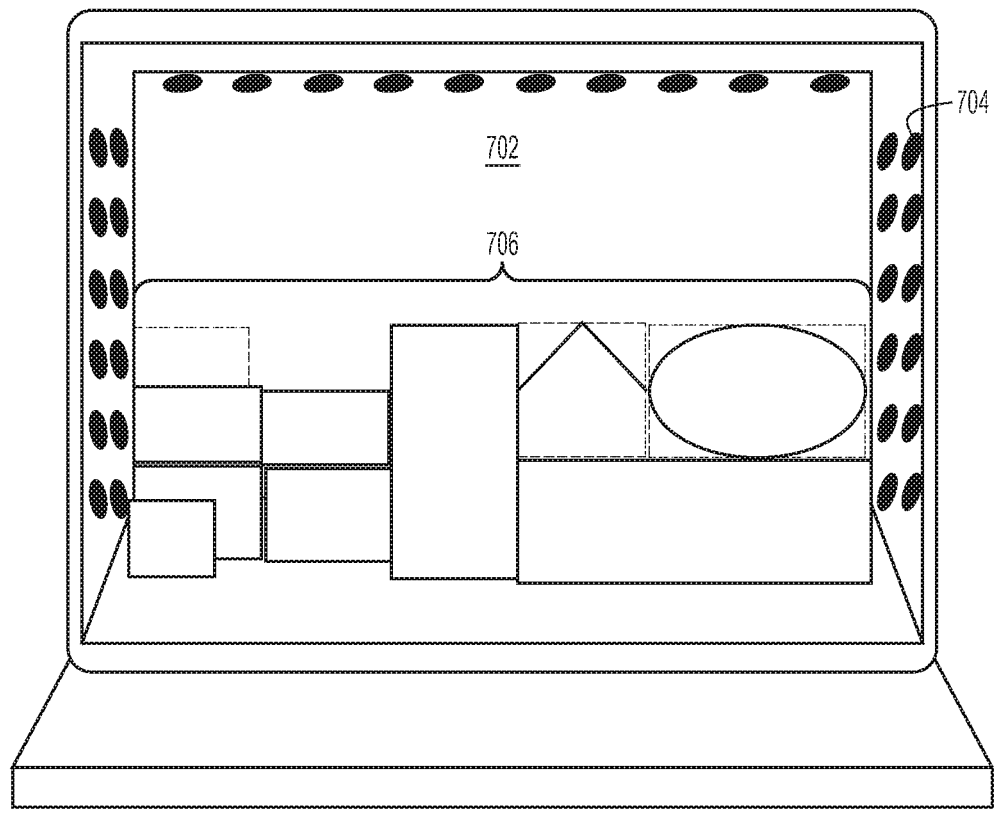
FIG. 7 shows an example cargo space with an arrangement of items according to some embodiments.

FIG. 7 illustrates an example cargo space 702 of a vehicle in various embodiments. The cargo space may include multiple sensors 704 mounted on, for example, at least two sides and a top surface of cargo space 702. In some embodiments, sensors 704 may include infrared sensors. FIG. 7 shows a number of items 706 in cargo space 702. In some embodiments, an optimal arrangement of items may be displayed by computing device 130 in an augmented reality environment. Items to be added to cargo space 702 may be shown surrounded by a respective cube, displayed with dashed lines.

In other embodiments, the optimal arrangement of items may be displayed in a virtual reality environment. For example, in an embodiment, a user may experience viewing the optimal arrangement of items in a virtual reality environment in which the user may see the cargo space of the vehicle with the items arranged in the cargo space according to the optimal arrangement. In this virtual reality environment, the user may change an angle of viewing to, for example, a right side view of the vehicle, a left side view of the vehicle, a top side view of the vehicle, or a front side view of the vehicle, in which all but the items in the cargo space appear to be transparent. In this way, the user may view the optimal arrangement from a number of different viewing angles.

Figure 8:
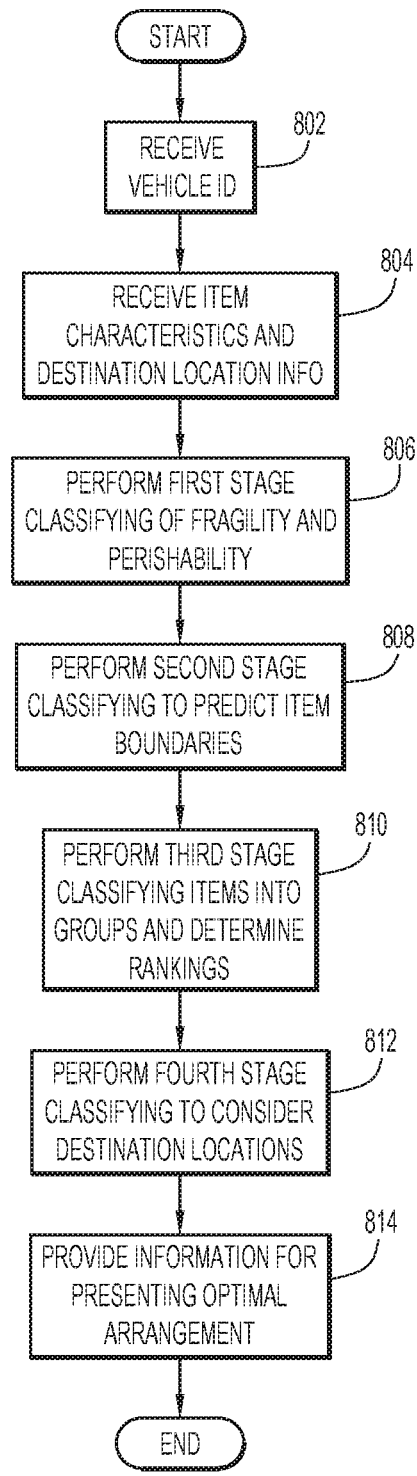
FIG. 8 is a high-level flowchart showing example processing that may be performed in multiple stages of classifying items according to various embodiments.

FIG. 8 is a flowchart of a process that includes multiple classifying stages that may be performed by processing engine 120 in various embodiments to determine an optimal arrangement of items. The process may begin by receiving a vehicle ID that uniquely identifies a vehicle for transporting items to one or more destination locations (act 802). The vehicle ID may be input to computing device 130 and provided to processing engine 120 via network 102.

Processing engine 120 then may receive characteristics, or attributes, of each item to be loaded into a cargo space of the vehicle (act 804). In some embodiments, one or more barcode scanners may scan one or more barcode associated with each respective item to be loaded into the cargo space. The one or more barcode scanners may map the scanned barcode to the attributes, which then may be provided to processing engine 120. Alternatively, processing engine 120 may receive barcode data as a result of the scanning of the barcodes and may map the barcode data to the attributes of the each respective item to be loaded into the cargo space.

Next, processing engine 120 may perform a first stage of classifying with respect to fragility and perishability based on at least some of the attributes of the each respective item (act 806). The first stage of classifying may include applying attribute values of the each respective item to previously trained multinomial logit (multi logit) machine learning model to predict, respectively, a relative fragility probability index (RFPI) and a relative perishability probability index (RPPI), both of which have a value between zero and one inclusive.

Processing engine 120 then may perform a second stage of classifying, which predicts item boundaries for the each respective item (act 808). The second stage of classifying may receive point data from sensors 106 at a source location of the each respective item to be loaded into the cargo space of the vehicle. Another trained machine learning model may predict contours and lines for the each respective item based on the received point data for the each respective item. A three dimensional analysis of the point data may be performed and a volume of the each respective item may be determined based on the three dimensional analysis.

Processing engine 120 then may perform a third stage of classifying items into groups and determining rankings of the groups (act 810).

Processing engine 120 then may perform a fourth stage of classifying based on output from the third stage of classifying and a sequence of destination locations for the each respective item to produce and optimal arrangement of the each respective items (act 812). In some embodiments, a support vector machine may be employed to determine a final grouping of items for the optimal arrangement.

Processing engine 120 then may provide information for presenting the optimal arrangement (act 814). The information may be provided to computing device 130, which may present the optimal arrangement in an augmented reality environment, a virtual reality environment, or another environment.

Figure 9:
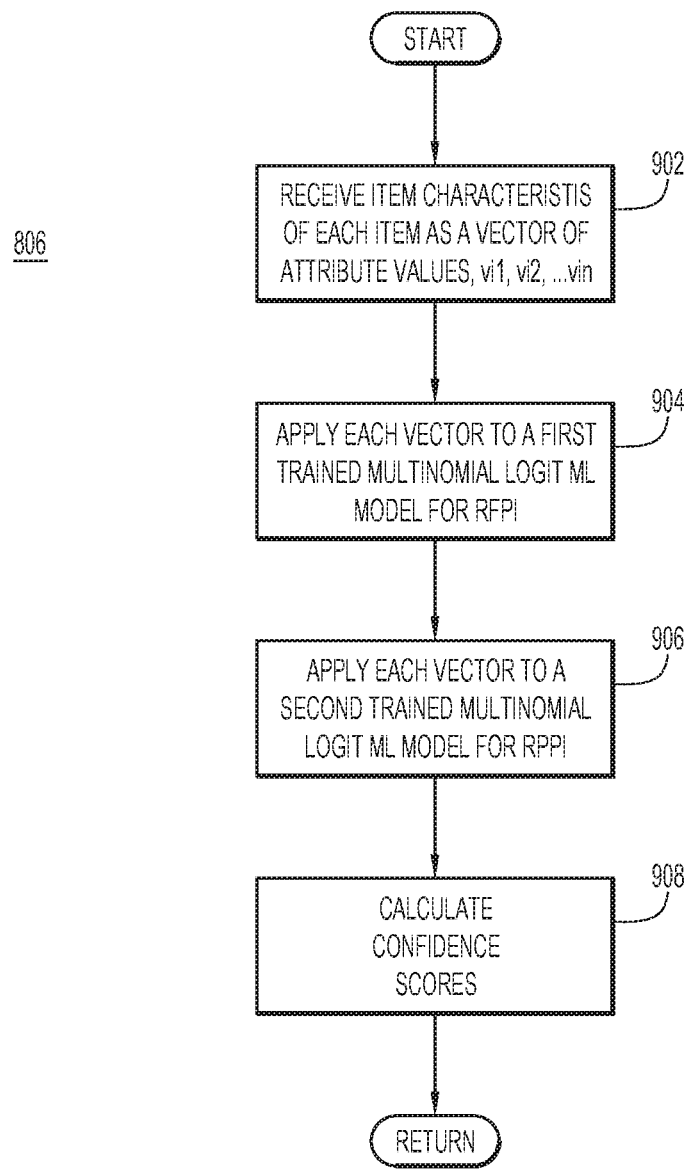
FIG. 9 is a flowchart illustrating example processing that may be performed during a first stage of classifying according to embodiments.

FIG. 9 is a flowchart of an example process that may be performed by processing engine 120 during act 806, which includes the first stage of classifying. The process may begin with processing engine 120 receiving characteristics, or attributes, of each respective item to be loaded into a cargo space of a vehicle at a source location (act 902). In some embodiments, one or more barcode scanners at the source location may scan one or more barcodes associated with the each respective item and may provide corresponding associated attributes to processing engine 120. In other embodiments, the one or more barcode scanners may provide codes corresponding to the one or more scanned barcodes to processing engine 120, which may map the one or more scanned barcodes to the corresponding associated attributes of the each respective item. The attribute values of the each respective item may be viewed as vectors of attribute values, vi1, vi2, . . . vin, where i is the $i^{th}$ item and 1, 2, . . . , n refer to the first, second, . . . $n^{th}$ attribute value.

Each of the vectors may be applied to a first trained multinomial logit machine learning (ML) to derive a relative fragility probability index (RFPI) (act 904) and may be applied to a second trained multinomial logit ML model to derive a relative perishability probability index (RPPI) (act 906). A multinomial logit ML model for K possible outcomes may be mathematically defined by the following equations:

$$Pr(Y_i = K-1) = \frac{e^{\beta_{K-1} \cdot X_i}}{1 + \sum_{k=1}^{K-1} e^{\beta_k \cdot X_i}} \text{ and}$$

$$Pr(Y_i = K) = \frac{1}{1 + \sum_{k=1}^{K-1} e^{\beta_k \cdot X_i}},$$

where $X_i$ represents a vector of attribute values that influence the probability and $\beta_k$ represents a defined constant.

Confidence scores may be calculated with respect to confidence that a particular fragility classification is correctly classified and a particular perishability classification is correctly classified (act 908).

Figure 10:
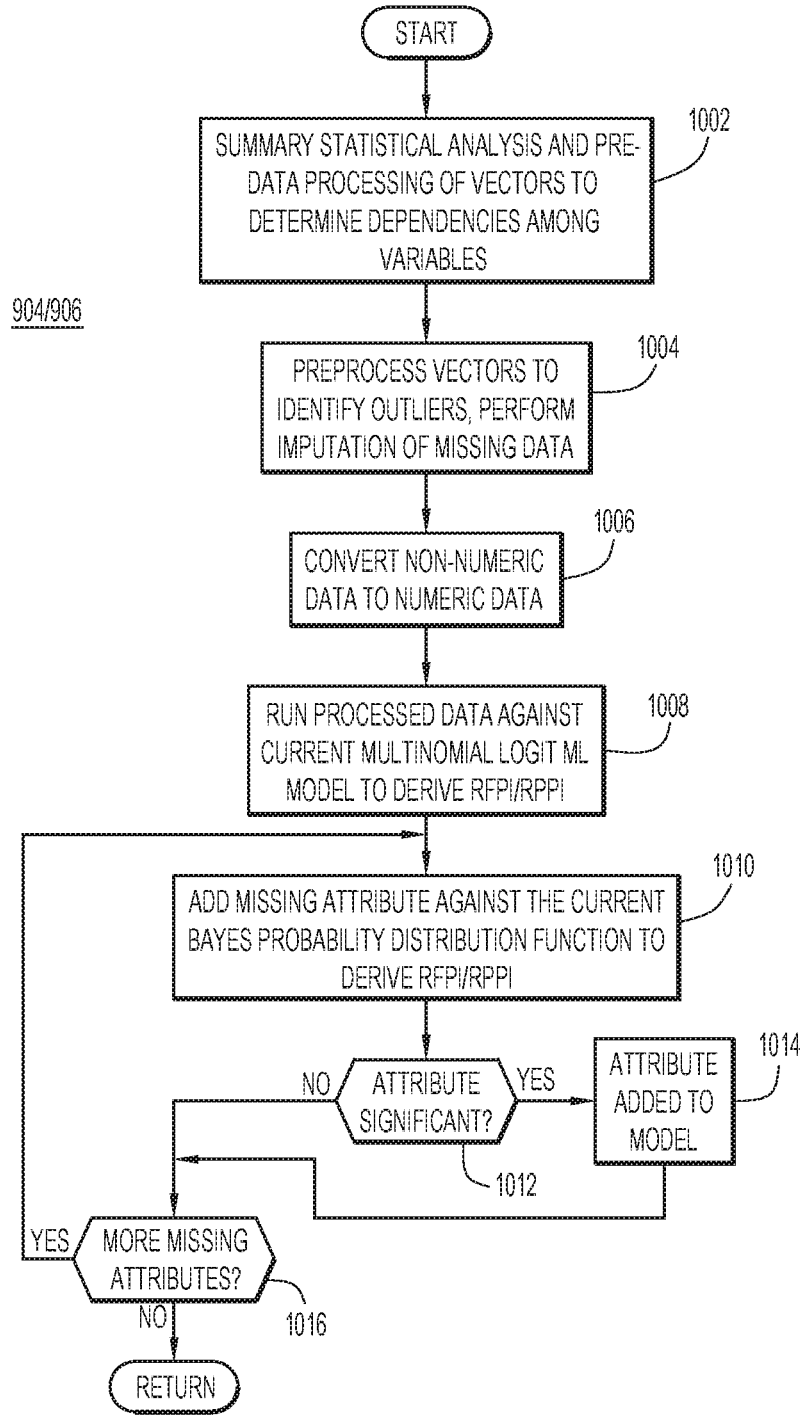
FIG. 10 is a flowchart illustrating example processing that may be performed according to acts 904 and 906 of FIG. 9 according to embodiments.

FIG. 10 is a flowchart corresponding to processing with respect to either act 904 for RFPI or act 906 for RPPI. To simplify a description of the processing, as shown in FIG. 10, assume that FIG. 10 corresponds to act 904. The process may begin by performing a summary statistical analysis and pre-data processing of vectors, where for example item i corresponds to a vector, {Vi1, Vi2, . . . Vin}, to determine dependencies among variables (e.g., attribute values in a vector) (act 1002). The summary statistical analysis summarizes a set of observations in order to communicate a large amount of information as simply as possible. The summary statistical analysis may identify important properties on a raw data set such as, for example, central tendency, statistical dispersion, skewness, correlation coefficient, variance, interquartile range, etc. Pre-processing of attribute values in a vector may be performed to identify outliers and perform imputation of missing data, etc. (act 1004). Categorical, or non-numeric, attribute value data types may be converted to numeric data types (act 1006). The processed data may be applied to a current multinomial logit ML model to derive a RFPI (act 1008). If an attribute is missing from the current multinomial logit ML model, the missing attribute and its corresponding value may be added against a current Bayes probability distribution function to derive an updated RFPI (act 1010).

Next, processing engine 120 may determine whether the added missing attribute is a significant contributor toward a final RFPI (act 1012). Significance may be represented by statistical measures such as, for example, p-value and adjusted r-squared values.

An adjusted R-squared value indicates an amount of variation explained by a model. Thus, 0.1 adjusted R-squared indicates that the model explains 10% of variation within data. An increased R-square value indicates a better model.

If the p-value is less than a significance level (usually 0.05) then the model fits the data well.

Returning to act 1012, if the attribute is determined to be significant, then the attribute is added to the model (act 1014).

After adding the attribute to the model or after determining that the attribute is not significant, processing engine 120 may determine whether there are any additional missing attributes (act 1016). If there are no additional missing attributes, then processing is completed. Otherwise, acts 1010-1016 again may be performed.

Although the processing in FIG. 10 was described with respect to determining the RFPI, this example process may also be applied with respect to determining the RPPI (act 906). If acts 1002-1006 had already been performed with respect to the attribute values, then acts 1002-1006 need not be performed again for the same attribute values. The remaining acts of FIG. 10 may be performed with respect to the RPPI instead of the RFPI.

Figure 11:
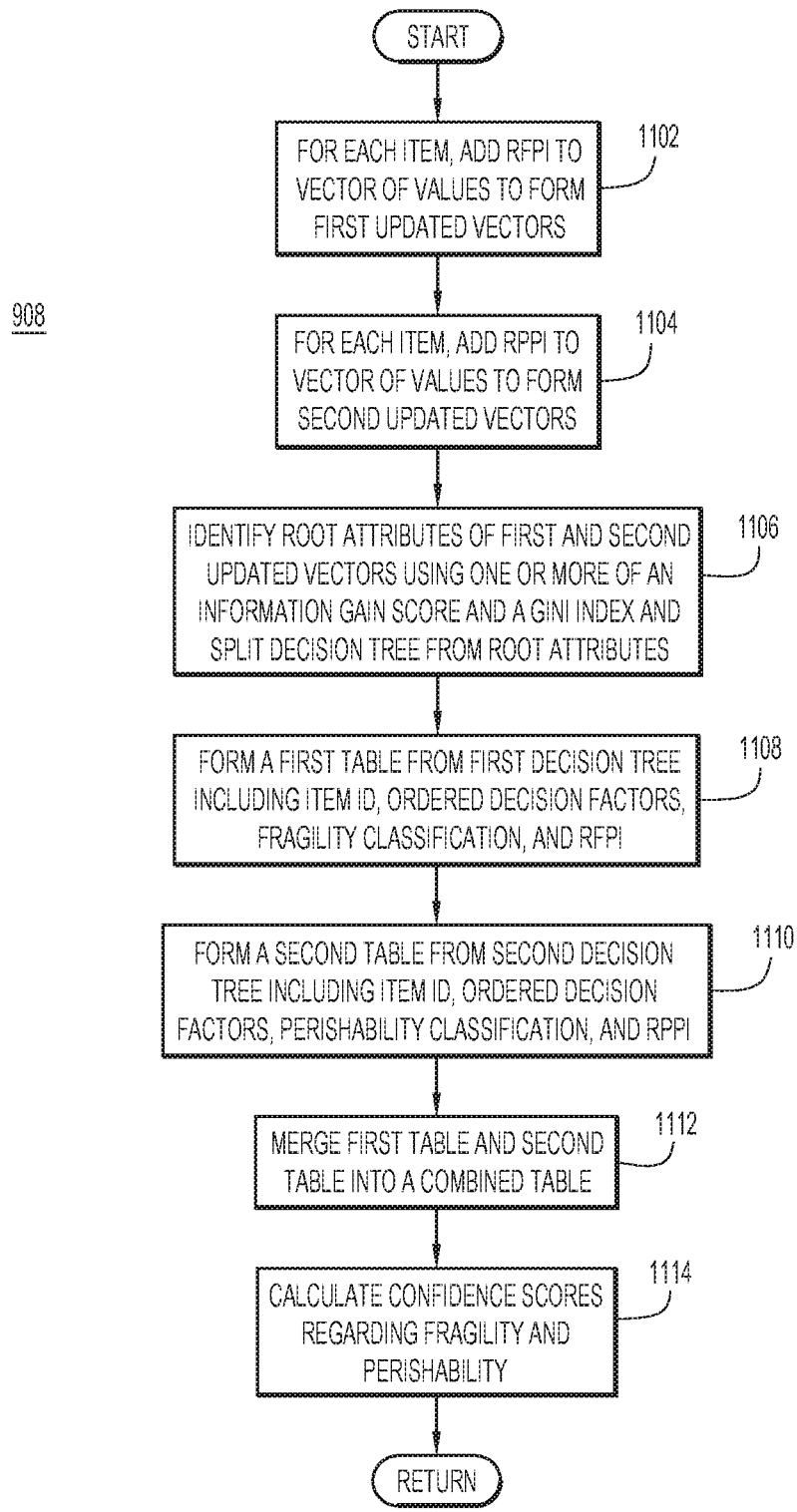
FIG. 11 is a flowchart showing example processing for calculating confidence scores for classifications of items according to embodiments.

FIG. 11 is a flowchart of an example process that may be performed by processing engine 120 to perform act 908 to calculate confidence scores with respect to either the RFPI or the RPPI. The process may begin with processing engine 120 adding the RFPI to a corresponding vector of values for each respective item to form first updated vectors (act 1102). Processing engine 120 then may add the RPPI to a corresponding vector of values for the each respective item to form second updated vectors (act 1104). An example form of the first updated vectors and the second updated vectors for 'N' items is shown, respectively, in Tables 1 and 2 below.

TABLE 1

| Item   | V1  | V2  | ... | ... | RFPI |
|--------|-----|-----|-----|-----|------|
| Item 1 | V11 | V12 |     |     | 0.77 |
| ...    | ... | ... |     |     | ...  |
| Item n | Vn1 | Vn2 | ... | ... | 0.33 |

TABLE 2

| Item   | VI  | V2  | ... | ... | RPPI  |
|--------|-----|-----|-----|-----|-------|
| Item 1 | V11 | V12 |     |     | 0.66  |
| ...    | ... | ... |     |     | ...   |
| Item n | Vn1 | Vn2 | ... | ... | 0.234 |

Next, a first decision tree and a second decision tree may be formed based on Tables 1 and 2, respectively. A number of fragility classifications and perishability classifications may be formed based on respective ranges of the RFPI and the RPPI. The following are example fragility classifications and their RFPI ranges: (Not Fragile, 0-0.2), (Slightly Fragile, 0.21-0.40), (Fragile, 0.41-0.60), (Very Fragile, 0.61-0.80), and (Extremely Fragile, 0.81-1.0). Similarly, the following are example perishability classifications and there RPPI ranges: (Not Perishable, 0-0.2), (Slightly Perishable, 0.21-0.40), (Perishable, 0.41-0.60), (Very Perishable, 0.61-0.80), and (Extremely Perishable, 0.81-1.0). Root attributes for a first decision tree and a second decision tree then may be identified within the first and the second updated vectors, respectively, using one or more boosting techniques (act 1106). For example, at least one of an information gain score and a Gini index may be used to identify the root attributes for the given number of first and second updated vectors.

The information gain score determines which attributes provide maximum information about a class. Information gain score is based on entropy, which is a degree of uncertainty, disorder, or impurity, its goal is to reduce a level of entropy beginning at the root node down to the leaf nodes. Entropy may be determined according to:

$$E(S) = \sum_{i=1}^{c} -p_i \log_2 p_i,$$

where 'p' is a probability and E(S) is the entropy.

The Gini index measures the degree or probability of a particular variable being wrongly classified when randomly chosen. A value of the Gini index is between 0 and 1, where 0 indicates that all items belong to a certain class, or that only one class exists, and 1 indicates that the items are randomly distributed across various classes. A Gini index of 0.5 indicates that items are equally distributed into some classes. A formula for the Gini index is:
Gini=$1-\Sigma_{i=1}^{n}(p_i)^2$, where $p_i$ is a probability of an object being classified in a particular class. The root node may be chosen as the attribute having a smallest Gini index.

Processing engine 120 then may form a first table from the first decision tree (act 1108). The first table may include an item ID, ordered decision factors, a fragility classification and a RFPI from a multi logit model.

Table 3 below is an example table including decision factors in order of traversal from a root node of the first decision tree, a classification, and a RFPI from a trained multi-logit model.

TABLE 3

| Items | Decision Factors in order of traversal from root | Classification | RFPI |
|---|---|---|---|
| Item 1 | V3 | Not Fragile | 0.11 |
|  | V4 |  |  |
|  | V6 |  |  |
|  | . . . |  |  |
|  | Vn-4 |  |  |
| Item 2 | V1 | Slightly Fragile | 0.28 |
|  | V6 |  |  |
|  | V9 |  |  |
|  | . . . |  |  |
|  | Vn |  |  |
| . . . | . . . | . . . | . . . |

Processing engine 120 then may form a second table from a second decision tree including item ID, or decision factors, perishability classification, and RPPI from a multi logit model (act 1110).

Table 4 below is an example table including decision factors in order of traversal from a root node of the second decision tree, a classification, and an RPPI from a trained multi-logit model.

TABLE 4

| Items | Decision Factors in order of traversal from root | Classification | RPPI |
|---|---|---|---|
| Item 1 | V3 | Not Perishable | 0.04 |
|  | V4 |  |  |
|  | V6 |  |  |
|  | . . . |  |  |
|  | Vn-4 |  |  |
| Item 2 | V1 | Slightly Perishable | 0.21 |
|  | V6 |  |  |
|  | V9 |  |  |
|  | . . . |  |  |
|  | Vn |  |  |
| . . . | . . . | . . . | . . . |

In some embodiments, processing engine 120 may merge the two tables to indicate cumulative details in a combined table (act 1112). The processing engine 120 may perform Association Rule Mining (ARM) to calculate confidence scores with respect to each classification, the decision factors with respect to each classification, and the RFPI and RPPI values (act 1114). Mathematically, a confidence score is defined as
Rule: X implies Y with $$\text{Confidence} = \frac{frq(X, Y)}{frq(X)},$$

where Y represents the ordered decision factors, X represents either a particular fragility classification or a particular perishability classification, frq(X,Y) represents a number of times items, from a set of N items, having ordered decision factors Y are classified in classification X, and frq(X) represents a number of times items from a set of N items are classified in classification X.

A final output of stage 2 may include a matrix indicating, for each item, a perishability classification, a confidence score with respect to the perishability classification, a confidence score with respect to the fragility classification, the fragility classification, RPPI, and RFPI.

Table 5 shows an example matrix, produced during stage 2, that illustrates an example numerical representation from a probability value perspective for relative fragility and relative perishability with respect to a set of items to be placed in a cargo space of a vehicle.

TABLE 5

| Item | Perishable | Perishable Confidence | Fragile Confidence | Fragile | RPPI | RFPI |
|---|---|---|---|---|---|---|
| Item 1 | High | 0.66 | 0.33 | Not Fragile | 0.8 | 0.5 |
| . . . | . . . | . . . | . . . | . . . |  |  |
| Item n | Low | 0.22 | 0.77 | Highly Fragile | 0.3 | 0.88 |

Figure 12:
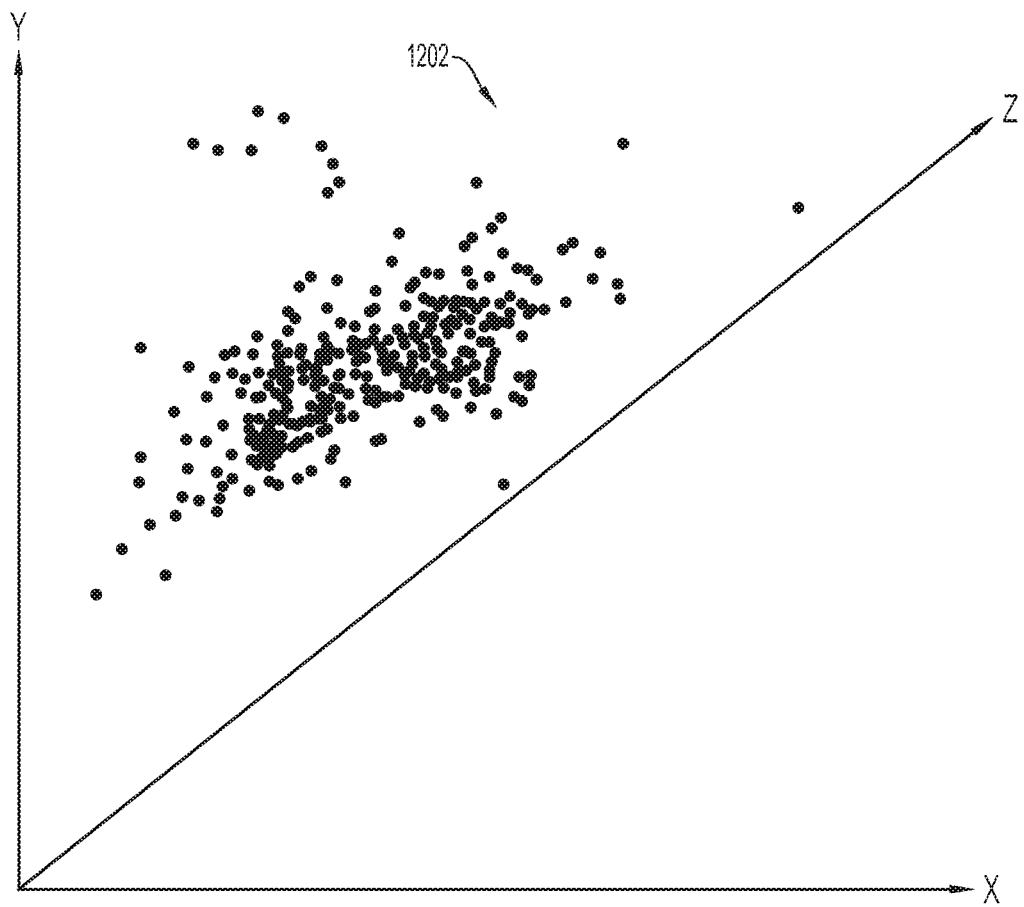
FIG. 12 illustrates example data points reported by sensors as a result of sensing multiple points on surfaces of an item according to an embodiment of the present invention.

In stage 2, processing engine 120 may receive coordinates regarding surfaces of respective items. The coordinates may be provided from sensors at a source location. In some embodiments, the sensors may be infrared sensors for detecting coordinates on the surfaces of the respective items. FIG. 12 illustrates example data points representing coordinates on a surface of an item.

Figure 13:
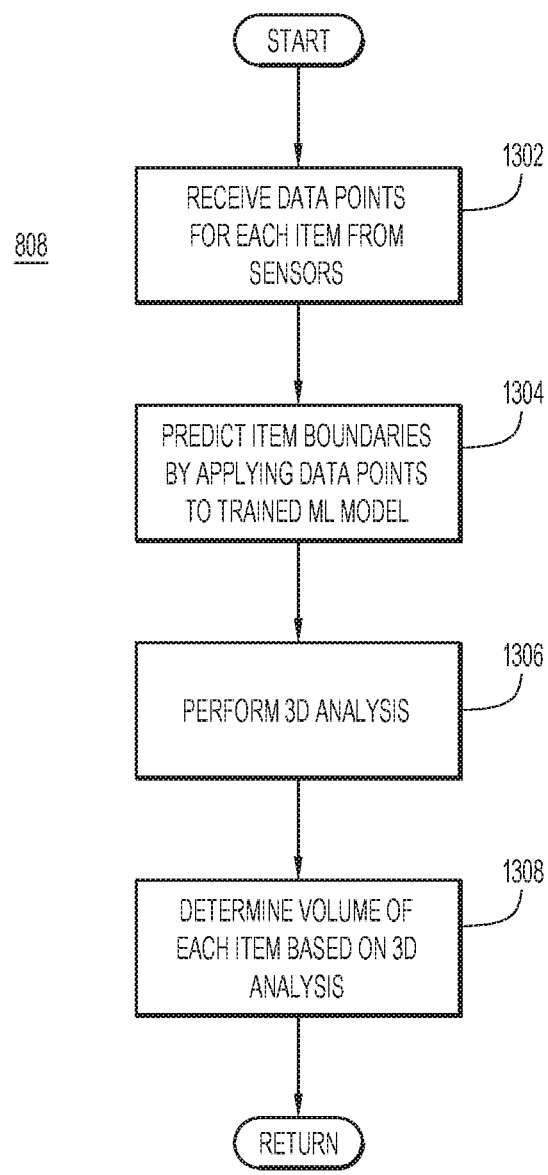
FIG. 13 illustrates example processing during a second stage of classifying items according to embodiments.

FIG. 13 is a flowchart of an example process for performing act 808 of the second stage for classifying lines and contours and predicting item boundaries. The process may begin with processing engine 120 receiving data points regarding surfaces of each respective item from a number of sensors 106 (act 1302). A contour tracing method, which may execute on processing engine 120, may include a machine learning model trained to predict lines and contours from the data points in order to further predict item boundaries (act 1304). A three dimensional analysis of the predicted item boundaries may be performed (act 1306) in order to determine a volume of the each respective item (act 1308).

Output from stage 2 may include spatial details for each classification, or group, of items. When items are determined to have uneven contours, the items may be grouped as shown in Table 6.

TABLE 6

| Item | Contour Type | Coordinates 1 | Coordinates 2 | ... | Coordinates N |
|---|---|---|---|---|---|
| Item 1 | ac | 2, 3, 5 | 11, 5, 6 | ... | |
| ... | ... | ... | ... | ... | |
| Item N | ... | ... | ... | ... | |

In the above table, "ac" represents a particular contour type.

Figure 14:
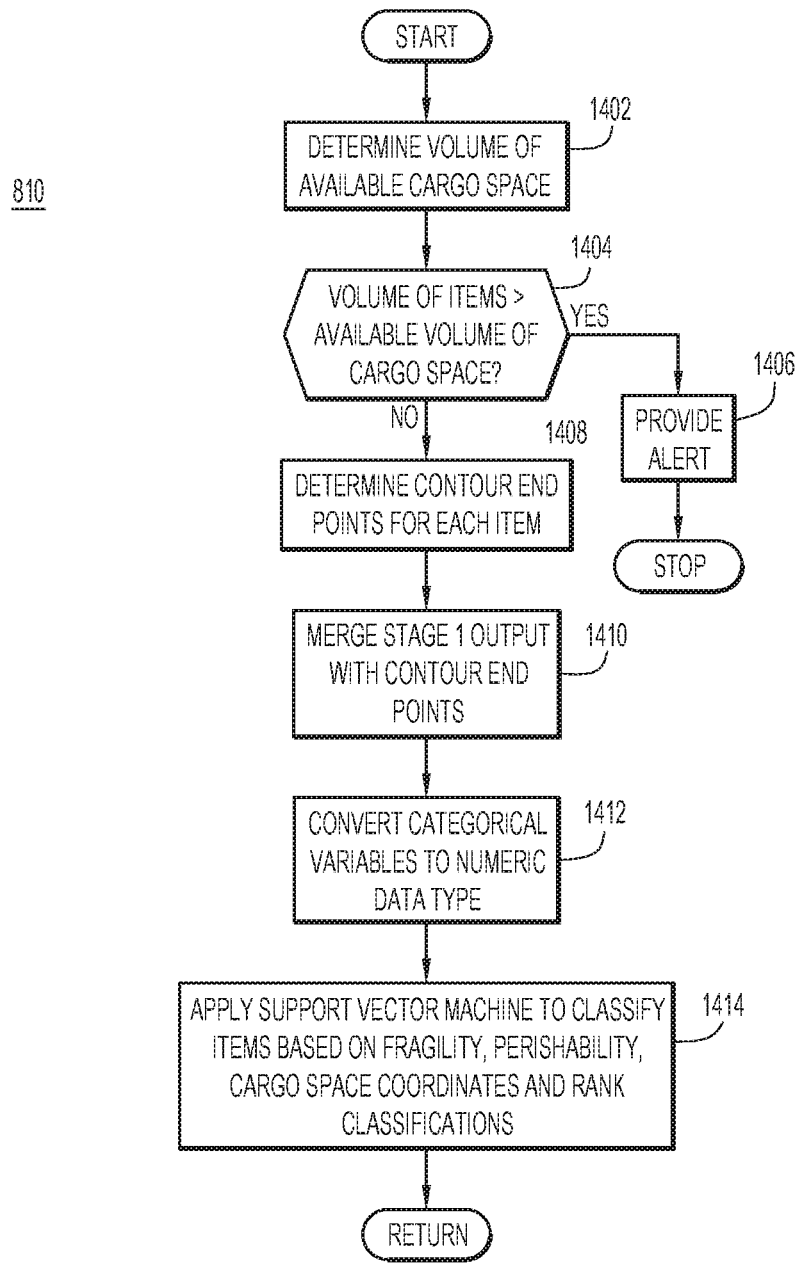
FIG. 14 illustrates example processing during a third stage of classifying items according to embodiments.

FIG. 14 is a flowchart of an example process for performing act 810, during a third stage, to classify items into groups and determine rankings of the groups. The process may begin by determining a volume of available cargo space of the vehicle (act 1402). In some embodiments, a user may provide a vehicle ID to processing engine 120 via, for example, a user interface of computing device 110. Using the vehicle ID, processing engine 120 may obtain a cargo space capacity of a cargo space corresponding to a vehicle identified by the vehicle ID. Sensors 104 within the cargo space may provide point data regarding surfaces of items already within the cargo space from which a remaining available volume of the cargo space may be determined by processing engine 120.

Next, processing engine 120 may determine whether a total of the volume of items to be loaded into the cargo space of the vehicle is greater than the remaining available volume of the cargo space (act 1404). If the total volume of items to be loaded into the cargo space is greater than the remaining available volume of the cargo space, then an alert may be provided indicating that the items to be loaded into the cargo space exceed the remaining available volume of the cargo space (act 1406). The alert may be provided via a message displayed on a display screen of computing device 110, may be provided via a telephone call, text message, email, or via another method. After providing the alert, the process may not continue.

If, during act 1404, the total volume of the items to be loaded into the cargo space is determined to be less than or equal to the remaining available volume in the cargo space, the coordinates of the items may be adjusted to correspond with the remaining available volume in the cargo space and contour end points are determined for each item with respect to the cargo space (act 1408). Output from the stage 1 processing may be merged with the contour endpoints on a per item basis (act 1410). Resulting data for each item may include but not be limited to, item ID, upper coordinates, lower end coordinates, midlevel coordinates, perishability classification, perishability confidence score, fragility classification, and fragility confidence score. Processing engine 120 then may convert categorical data types, or non-numeric data types, to a numerical data type (act 1412).

Next, processing engine 120 may perform support vector machine (SVM) processing on the data in order to classify each item based on fragility, perishability, cargo space coordinates, and classification rankings (act 1414). The SVM includes a machine learning algorithm that solves classification problems, uses a flexible representation of class boundaries, and implements automatic complexity control to reduce overfitting.

SVMs can be used for linear and non-linear datasets. In various embodiments, an assumption is made that a derived dataset is non-linear. Therefore, a Radial Basis Function (RBF) Kernel approach, which is a known method for classifying non-linear datasets, may be used in the various embodiments. In the various embodiments, data input to the RBF kernel, which was produced during acts 1408-1412, include a vector for each item. Each vector may include, but not be limited to, item ID, upper coordinates, lower end coordinates, midlevel coordinates, perishability classification, perishability confidence score, fragility classification, and fragility confidence score, wherein non-numeric data types have been converted to numeric data types. The RBF kernel transforms non-linear data to a linear data plane. Mathematically, each of the input vectors to the RBF kernel may be expressed as a polynomial equation such as, for example, $a_1x_1+a_2x_2+a_3x_3+ \ldots a_nx_n+C=0$, where $a_i$ corresponds to coefficients, or weights, $x_i$ corresponds to each dependent variable such as, for example, the upper coordinates, lower end coordinates, midlevel coordinates, perishability classification, perishability confidence score, fragility classification, and fragility confidence score for an item. C is a constant. The RBF kernel applies an established mathematical postulation $$K(x, x') = \frac{\exp(\|x - x'\|^2)}{2 \cdot \text{Sigma}^2},$$

where K is the RBF kernel, x and x' are two vectors in some input space, and sigma is a RBF kernel specific factor, which is tuned over iterations to control the non-linearity of the data.

A cost function of the RBF kernel defines a miscalculation percentage as a numerical value. An iterative combination of cost function and non-linearity factor for the input vectors (representing each item label combination) will give a range of percentages. Output from this stage will be a matrix that list details about each of the items being classified into a respective group and the cost function associated with each label pertaining to the respective group. Table 7, below, shows an example matrix including a cost function for each of the labels of each item.

TABLE 7

| Item | Label 1 | Label 2 | Label 3 | ... | Label n | Class |
|---|---|---|---|---|---|---|
| Item 1 | .76 | .66 | ... | ... | .22 | 5 |
| Item 2 | .55 | .45 | ... | ... | ... | 9 |
| ... | ... | ... | ... | ... | ... | ... |
| ... | ... | ... | ... | ... | ... | ... |
| Item n | .55 | .25 | ... | ... | ... | 4 |

A defined cost function score cut off may further define an acceptable range of miscalculation for a label of an item. Thus, the miscalculation percentages may define whether an item placed in a group based upon an influence of the dependent variables is or is not acceptable.

As discussed above, the SVM will classify items based on selected labels (e.g., fragility, perishability, cargo space coordinates, . . . ) having a Boolean value of 1. The SVM may be iteratively executed considering different labels for classification. For example, an upper coordinate variable may be used as a categorization label for a set of N items. The SVM may be iteratively executed for each attribute-based classification. Output from the SVM may include a matrix having a row for each item and a column for each label. For each item, a zero value in a column indicates that a corresponding label was not selected for that particular iteration of the SVM and a one value in a column indicates that a corresponding label was selected for that particular iteration of the SVM. This matrix may represent numerous combinations for each item with respect to different classification conditions.

The abovementioned matrix may be used for any standard ranking to rank classifications regarding an importance or significance of each respective classification with respect to a final outcome. For example, a classification with a highest number of labels used or selected may be ranked higher than classifications having a smaller number of labels selected. As another example, classifications having labels with more significance may outrank classifications having labels with less significance. A ranking approach or algorithm may be tuned according to business needs by defining control parameters as part of machine learning model design.

Figure 15:
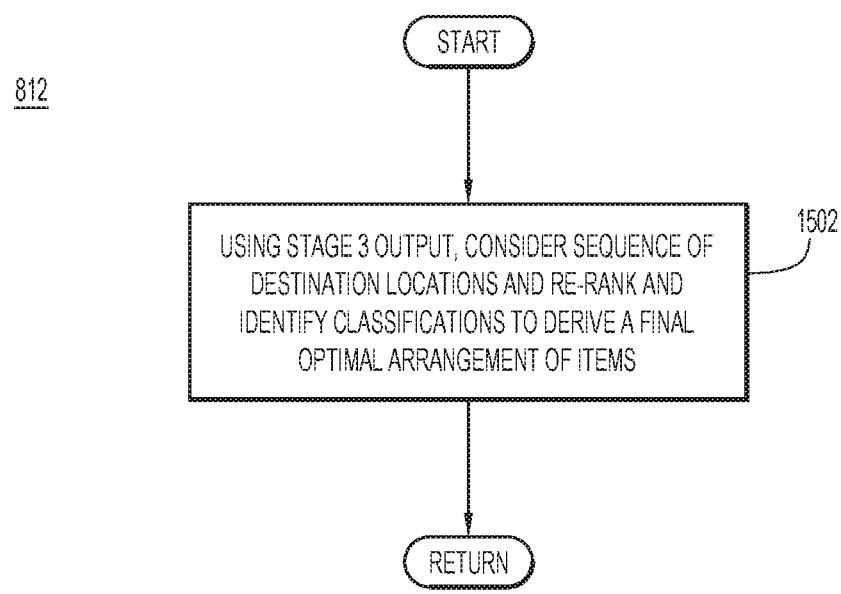
FIG. 15 shows example processing during a fourth stage of classifying items according to embodiments to derive an optimal arrangement of items in a cargo space.

During act 812, a fourth stage of classifying may be performed using the matrix output of the third stage while considering a sequence of destination locations for the items. Classifications may be identified and re-ranked in order to derive a final optimal arrangement of items (act 1502; FIG. 15).

Embodiments of the invention are not limited to only classifying items based on fragility, perishability, item boundaries, and destination locations. The items may be classified with respect to other attributes or considerations regarding the items. For example, other embodiments may further consider a number of locations from which items may be loaded into a cargo space of a vehicle. In such an embodiment, pickup locations as well as drop off locations for various items may be considered when classifying the items. As another example, other embodiments may further consider a condition of roads in which a vehicle carrying the items will travel to each location. For example, when determining an optimal arrangement of items, processing engine 120 may consider whether a road is inclined and a degree of inclination and may further consider other road conditions such as known potholes, etc. In yet another example, according to various embodiments, multiple users located at one or more locations may have items to be picked up by a vehicle and delivered to one or more other locations. Each pickup location may have a sensor area with multiple sensors for sensing points on a surface of items and providing information about the points to processing engine 120. The sensor area may be a shopping cart fitted with sensors, an area fitted with sensors within a room, or other suitable areas fitted with sensors. Processing engine 120, in this example, may determine an optimal arrangement of items, associated with the multiple users, in a common space.

It will be appreciated that the embodiments described above and illustrated in the drawings represent only a few of the many ways of implementing embodiments for determining an optimal arrangement of items in a cargo space of a vehicle.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific algorithms described above. For example, other machine learning models may be used to determine an optimal arrangement of items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for detecting and arranging items in a cargo space, the method comprising:
   detecting and classifying, with respect to fragility and perishability, a plurality of items at a source location by at least one processor, the classifying being based on obtained characteristics of each respective item and performed by a plurality of first machine learning models trained with a training set of items, wherein the classifying with respect to fragility and perishability further comprises:
   applying characteristics of the each respective item to the plurality of first machine learning models to predict a relative fragility probability index and a relative perishability probability index;
   determining respective fragility confidence scores regarding fragility classifications and respective perishability confidence scores regarding perishability classifications based on corresponding ordered decision factors from corresponding decision trees providing fragility and perishability classifications corresponding to value ranges of the relative fragility probability index and the relative perishability probability index; and
   determining corresponding fragility and perishability classifications for the each respective item based on corresponding fragility and perishability confidence scores and corresponding ordered decision factors;
   predicting, by the at least one processor, item boundaries based on applying a respective plurality of data regarding points on a surface of the each respective item to a second machine learning model trained to predict the item boundaries based on the points;
   classifying, by the at least one processor, the each respective item into a respective one of a plurality of groups with respect to an available volume of the cargo space based on sensor data of the cargo space, the classified fragility and perishability, the predicted item boundaries, and a third machine learning model;
   determining, by the at least one processor, an arrangement of the plurality of items in the cargo space based on the group classifications and a corresponding destination location associated with the each respective item;
   visualizing, by the at least one processor, the arrangement of the plurality of items in a virtual environment to provide a view of the arrangement of the plurality of items relative to the cargo space; and
   adjusting, by the at least one processor, an angle of the view in the virtual environment to provide a plurality of different viewing angles for the arrangement of the plurality of items.

2. The method of claim 1, wherein:
the characteristics of the each respective item are based on data received as a result of scanning one or more bar codes associated with the each respective item.

3. The method of claim 1, wherein
the plurality of first machine learning models include multinomial logit machine learning models.

4. The method of claim 1, wherein the predicting item boundaries further comprises:
applying, by the at least one processor, a contour tracing method to the respective plurality of data regarding the points on the surface of the each respective item to predict lines and contours connecting the points.

5. The method of claim 4, wherein the classifying into groups further comprises:
classifying each of the respective items with respect to a relative position within the cargo space based on the fragility classification, the perishability classification, the item boundaries, and the available volume of the cargo space.

6. The method of claim 1, wherein the determining the arrangement further comprises:
receiving, by the at least one processor, a corresponding destination for the each respective item; and
classifying, by the at least one processor, each of the respective items with respect to the corresponding destination, the fragility classification, the perishability classification, the predicted respective item boundaries and the available volume of the cargo space.

7. A computing system for determining and arranging items in a cargo space, the computing system comprising:
at least one processor;
at least one memory connected with the at least one processor; and
a network interface for the computing system to communicate with one or more other devices via a network, wherein the at least one processor is configured to perform:
detecting and classifying, with respect to fragility and perishability, a plurality of items at a source location, the classifying being based on obtained characteristics of each respective item and performed by a plurality of first machine learning models trained with a training set of items, wherein the classifying with respect to fragility and perishability further comprises:
applying characteristics of the each respective item to the plurality of first machine learning models to predict a relative fragility probability index and a relative perishability probability index;
determining respective fragility confidence scores regarding fragility classifications and respective perishability confidence scores regarding perishability classifications based on corresponding ordered decision factors from corresponding decision trees providing fragility and perishability classifications corresponding to value ranges of the relative fragility probability index and the relative perishability probability index; and
determining corresponding fragility and perishability classifications for the each respective item based on corresponding fragility and perishability confidence scores and corresponding ordered decision factors;
predicting item boundaries based on applying a respective plurality of data regarding points on a surface of the each respective item to a second machine learning model trained to predict the item boundaries based on the points;
classifying the each respective item into a respective one of a plurality of groups with respect to an available volume of the cargo space based on sensor data of the cargo space, the classified fragility and perishability, the predicted item boundaries, and a third machine learning model;
determining an arrangement of the plurality of items in the cargo space based on the group classifications and a corresponding destination location associated with the each respective item;
visualizing the arrangement of the plurality of items in a virtual environment to provide a view of the arrangement of the plurality of items relative to the cargo space; and
adjusting an angle of the view in the virtual environment to provide a plurality of different viewing angles for the arrangement of the plurality of items.

8. The computing system of claim 7, wherein:
the characteristics of the each respective item are based on data received as a result of scanning one or more bar codes associated with the each respective item.

9. The computing system of claim 7, wherein the plurality of first machine learning models includes multinomial logit machine learning models.

10. The computing system of claim 7, wherein the predicting item boundaries further comprises:
applying a contour tracing method to the respective plurality of data regarding the points on the surface of the each respective item to predict lines and contours connecting the points.

11. The computing system of claim 10, wherein the classifying into groups further comprises:
classifying each of the respective items with respect to a relative position within the cargo space based on the fragility classification, the perishability classification, the item boundaries, and the available volume of the cargo space.

12. The computing system of claim 7, wherein the determining the arrangement further comprises:
receiving a corresponding destination for the each respective item; and
classifying each of the respective items with respect to the corresponding destination, the fragility classification, the perishability classification, the predicted respective item boundaries and the available volume of the cargo space.

13. A computer program product for determining and arranging items in a cargo space, the computer program product comprising at least one computer readable storage medium having computer readable program code embodied therewith for execution on one or more processors, the computer readable program code being configured to be executed by the one or more processors to perform:
detecting and classifying, with respect to fragility and perishability, a plurality of items at a source location, the classifying being based on obtained characteristics of each respective item and performed by a plurality of first machine learning models trained with a training set of items, wherein the classifying with respect to fragility and perishability further comprises:
applying characteristics of the each respective item to the plurality of first machine learning models to predict a relative fragility probability index and a relative perishability probability index;
determining respective fragility confidence scores regarding fragility classifications and respective perishability confidence scores regarding perishability classifications based on corresponding ordered decision factors from corresponding decision trees providing fragility and perishability classifications corresponding to value ranges of the relative fragility probability index and the relative perishability probability index; and determining corresponding fragility and perishability classifications for the each respective item based on corresponding fragility and perishability confidence scores and corresponding ordered decision factors;

predicting item boundaries based on applying a respective plurality of data regarding points on a surface of the each respective item to a second machine learning model trained to predict the item boundaries based on the points;

classifying the each respective item into a respective one of a plurality of groups with respect to an available volume of the cargo space based on sensor data of the cargo space, the classified fragility and perishability, the predicted item boundaries, and a third machine learning model;

determining an arrangement of the plurality of items in the cargo space based on the group classifications and a corresponding destination location associated with the each respective item;

visualizing the arrangement of the plurality of items in a virtual environment to provide a view of the arrangement of the plurality of items relative to the cargo space; and adjusting an angle of the view in the virtual environment to provide a plurality of different viewing angles for the arrangement of the plurality of items.

14. The computer program product of claim 13, wherein:
the characteristics of the each respective item are based on data received as a result of scanning one or more bar codes associated with the each respective item.

15. The computer program product of claim 13, wherein the plurality of first machine learning models includes multinomial logit machine learning models.

16. The computer program product of claim 13, wherein the predicting item boundaries further comprises:
applying a contour tracing method to the respective plurality of data regarding the points on the surface of the each respective item to predict lines and contours connecting the points.

17. The computer program product of claim 16, wherein the classifying into groups further comprises:
classifying each of the respective items with respect to a relative position within the cargo space based on the fragility classification, the perishability classification, the item boundaries, and the available volume of the cargo space.

18. The computer program product of claim 13, wherein the determining the arrangement further comprises:
receiving a corresponding destination for the each respective item; and
classifying each of the respective items with respect to the corresponding destination, the fragility classification, the perishability classification, the predicted respective item boundaries and the available volume of the cargo space.

* * * * *